United States Patent [19]

Rabatin

[11] 4,195,228

[45] Mar. 25, 1980

[54] COLOR CONTRAST RADIOGRAPHIC DEVICE

[75] Inventor: Jacob G. Rabatin, Chardon, Ohio

[73] Assignee: General Electric Company, Schenectady, N.Y.

[21] Appl. No.: 907,441

[22] Filed: May 19, 1978

[51] Int. Cl.[2] .......... G01J 1/58

[52] U.S. Cl. .......... 250/483; 250/486

[58] Field of Search .......... 250/483, 486, 458, 460; 96/68, 67; 252/301.4 H

[56] References Cited

U.S. PATENT DOCUMENTS

| | | | |
|---|---|---|---|
| 2,807,725 | 9/1957 | Schwerin | 250/65 |
| 3,121,232 | 2/1964 | Byler | 96/68 |
| 4,054,798 | 10/1977 | Watanabe et al. | 250/483 |
| 4,101,781 | 7/1978 | Neukermans et al. | 250/483 |
| 4,130,428 | 12/1978 | Doorselaer | 250/483 |

*Primary Examiner*—Bruce C. Anderson
*Attorney, Agent, or Firm*—John F. McDevitt; Lawrence R. Kempton

[57] ABSTRACT

An x-ray image converter for converting x-rays to visible light after passage through a photographed object in order to produce improved colored radiographs on an associated color photographic film attributable to localized color shift in the photographic film medium. The desired color shift produced by the x-ray image converter is achieved with use of a phosphor material which exhibits differential absorption of the x-radiation in the 35–50 KeV region due to $K_{\alpha}$edge effects. In the conversion of x-rays to visible light in the desired manner, the new phosphor combination is useful in x-ray image intensifier tubes, in fluoroscopic screens, in radiographic intensifier screens, and other x-ray image converter devices.

8 Claims, 3 Drawing Figures

COLOR CONTRAST RADIOGRAPHIC DEVICE

BACKGROUND OF THE INVENTION

Color radiographs have been produced heretofore as a means to obtain more information in medical radiography compared with black and white radiographic images which are limited to variations in one parameter, namely, brightness. Accordingly, the contrast in black and white radiographs is limited to differences in shades of grey. On the other hand, color images are capable of variation in the three parameters of brightness, hue, and saturation. In the already known colored radiographic systems, a plurality of color images is produced on different color photographic films each exposed to a different monochromatic x-ray source after passage through the object being photographed. Such coupling of a suitable color film with an individual monochromatic x-ray source in order to produce different color images which then must be compared is understandably a cumbersome method to achieve color contrast. Additionally, the x-ray generators now being employed for medical radiography produce polyenergetic beams susceptible to attenuation of the beam by body parts especially in the higher wavelength x-ray region having lowest penetration energy. It can be appreciated from such limitations in the prior art systems of color contrast radiography that a more practical and more effective means of obtaining information with a color radiograph would be desirable.

SUMMARY OF THE INVENTION

It has now been discovered, surprisingly, that an x-ray image converter can be constructed utilizing the phosphor combination which includes one phosphor exhibiting differential absorption of the x-radiation in the 35–50 KeV region due to $K_\alpha$ edge effects so as to provide a color shift in an associated color photographic film when exposed to the phosphor combination after passage through a photographed object and thereby provide a color image exhibiting improved contrast. In certain of its preferred embodiments, a phosphor mixture is employed wherein the individual phosphor constituents are blended in suitable proportions to produce the desired color point. A suitable phosphor material exhibiting the desired differential absorption can be selected from the group having iodine, cesium, barium, and lanthanum ions in the phosphor matrix and whose $K_\alpha$ absorption edges all lie between 30–40 KeV region of x-ray excitation. The other phosphor constituent has ions in the phosphor matrix whose absorption edges are either significantly lower than the 30 KeV region, such as zirconium, strontium, yttrium, and cadmium, or higher absorption edges than the 50 KeV region such as gadolinium, lutetium, tungsten, and lead. On passing through a human body being exposed to x-radiation, the energy profile of x-rays will vary depending upon body absorption characteristics especially if enhanced by such contrast media as barium sulfate and iodide solutions. As the energy profile of the x-radiation is hardened from attenuation of the highest wavelength x-rays having the lowest penetration energy, it will unbalance the color of the composite emission being produced by the phosphor combination. The color change thereby produced will be depicted upon an appropriate color film operatively associated with the phosphor combination to show body part contrast as changes in hue, color saturation, and brightness.

A particularly useful embodiment of the present invention comprises a radiographic intensifier or x-ray screen member utilizing an admixture of two or more phosphors having different relatively narrow color emissions in the near ultraviolet-visible region of the spectrum and which includes an efficient rare earth phosphor as one of the phosphor constituents. Said rare earth phosphor constituent is preferably selected from the class of rare earth activated rare earth oxyhalide phosphors, rare earth activated rare earth oxide phosphors, rare earth activated rare earth oxysulfide phosphors, rare earth activated rare earth vanadate phosphors, and other rare earth activated phosphors. Color points of the composite emission from phosphor combinations selected in this manner can range from red-orange, green-yellow, and blue-near ultraviolet in providing the desired color contrast on an associated color photographic film sensitive to the color of the radiation being emitted. Accordingly, one such embodiment can comprise a layer of the phosphor admixture deposited on a support layer which is located adjacent to an ordinary color photographic film having a conventional three-layer construction of red, blue and green emulsions deposited on a support and which can further include a reflector layer underlying the phosphor layer in order to preclude loss of visible radiation being emitted by the phosphor. A different composite embodiment utilizes a pair of color photographic films operatively associated with a pair of x-ray screen members for simultaneous exposure to x-radiation after it passes through a photographed object. In said composite embodiment, one of said x-ray screen members emits light of a specific color and is located adjacent to a one-color type photographic film sensitive to said color emission while the remaining x-ray screen member includes the phosphor exhibiting differential absorption of the x-radiation in the 30–50 KeV region due to its $K_\alpha$ edge effects so as to provide a color shift in a different one-color photographic film being located adjacent the latter x-ray screen member.

Other embodiments of the present invention include fluoroscopic screens utilizing the present phosphor combination and x-ray image intensifier tubes having said phosphor combination deposited upon the entrance surface of the tube member. A more detailed description of the structural features for such latter type devices appears in U.S. Pat. No. 3,617,743, Rabatin et al, which is also assigned to the present assignee.

DETAILED DESCRIPTION OF THE INVENTION

Figure 1:
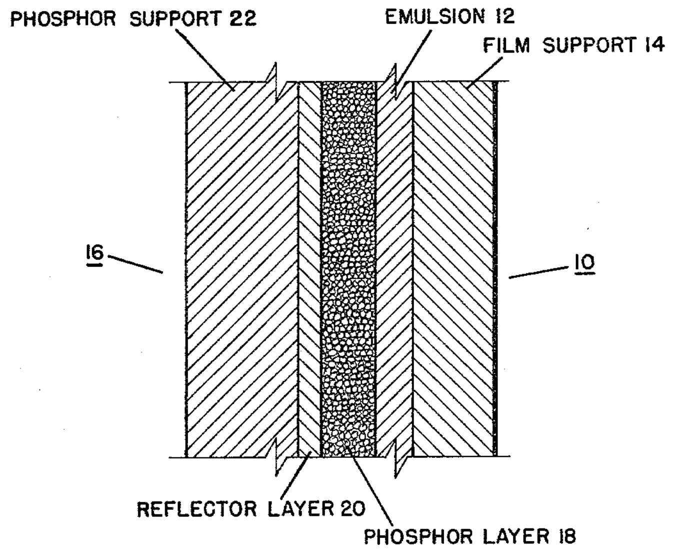
FIG. 1 is a cross section of an x-ray screen utilizing the phosphor system of the present invention.

Referring to the drawings, FIG. 1 shows an arrangement in cross section of a conventional three emulsion photographic film 10, such as Ektachrome 6115 type daylight film, having the emulsion layers 12 deposited on support layer 14. An adjoining x-ray intensifying screen member 16 includes a phosphor layer 18 in the form of a two-component phosphor admixture, deposited on a reflector layer 20, which in turn is deposited on a support layer 22. The reflector layer 20 enhances the back reflection of the visible radiation to increase exposure of the emulsion layers when the x-ray image converter device is excited by x-rays.

Accordingly, an x-ray image converter of the above type which included a two-component admixture of an LaOBr: 0.05 Tb phosphor with a conventional $CaWO_4$ phosphor was exposed to a 80 $KV_p$ x-ray source through a hambone part to simulate an approximately 10-inch thick human body equivalent homogenous medium. A large reduction in the number of softer x-ray photons in the 30–50 KeV region was experienced due to the sharp increase in the absorption at 39.5 KeV for the LaOBr phosphor attributable to a $K_\alpha$ absorption edge effect of the lanthanum constituent. LaOBr absorbs a significantly greater number of x-ray photons in this region compared to the $CaWO_4$ phosphor constituent. In the specific phosphor admixture illustrated, the individual phosphor constituents were blended together in amounts to provide a desired color point having the approximate C.I.E. chromaticity values X=0.448 and Y=0.344 and produced color contrast in the recording photographic film shown by changes in brightness, hue and saturation. While the color changes produced thereby were found relatively small and gradual, a contrast medium such as barium sulfate or iodide produces more dramatic changes since the $K_\alpha$ absorption edges of barium and iodide are near that of lanthanum. Because of this increased absorption by the barium or iodide ion in the 35–40 KeV region, a greater unbalancing of emission colors will be produced.

In Table I below, there is shown the various color shifts possible with other phosphor admixtures when exposed through aluminum filtration simulating body parts from a 90 $KV_p$ x-ray excitation source. The color shift is represented in said table by the C.I.E. chromaticity X and Y values as measured with a Trirad II colorimeter device manufactured by Kollmorgan Corporation.

TABLE I

| Example | Screen Composition (Weight %) | Al Filter (Inches) | Color X | Points Y |
|---|---|---|---|---|
| | 47% LaOBr: .05 Tb | 0 | .405 | .412 |
| 1 | 20% SrCl Apatite:Eu | 1/8" | .413 | .409 |
| | 33% $Gd_2O_3$:Eu | 1/4" | .430 | .397 |
| | | 1/2" | .487 | .358 |
| | 25% LaOBr .05 Tb | 0 | .291 | .211 |
| 2 | 40% $CaWO_4$ | 1/8" | .320 | .224 |
| | 35% $Y_2O_3$:Eu | 1/4" | .344 | .223 |
| | | 1/2" | .463 | .201 |
| | 62% LaOBr .01 Tb | 0 | .408 | .375 |
| 3 | 38% $Y_2O_3$:Eu | 1/8" | .413 | .371 |
| | | 1/4" | .421 | .368 |
| | | 1/2" | .470 | .335 |
| | 35% LaOBr .05 Tb | 0 | .450 | .458 |
| 4 | 40% ZnS:Ag | 1/8" | .458 | .452 |
| | 25% $Gd_2O_3$:Eu | 1/4" | .475 | .441 |
| | | 1/2" | .541 | .376 |
| | 67% LaOBr .05 Tb | 0 | .430 | .474 |
| 5 | 33% $Gd_2O_3$:Eu | 1/8" | .437 | .467 |
| | | 1/4" | .452 | .455 |
| | | 1/2" | .461 | .450 |

As can be noted from the above indicated color shifts, the color changes are away from the lanthanum host phosphors as the x-rays become hardened with increasing thickness of the aluminum filters used to simulate body thickness changes.

Figure 2:
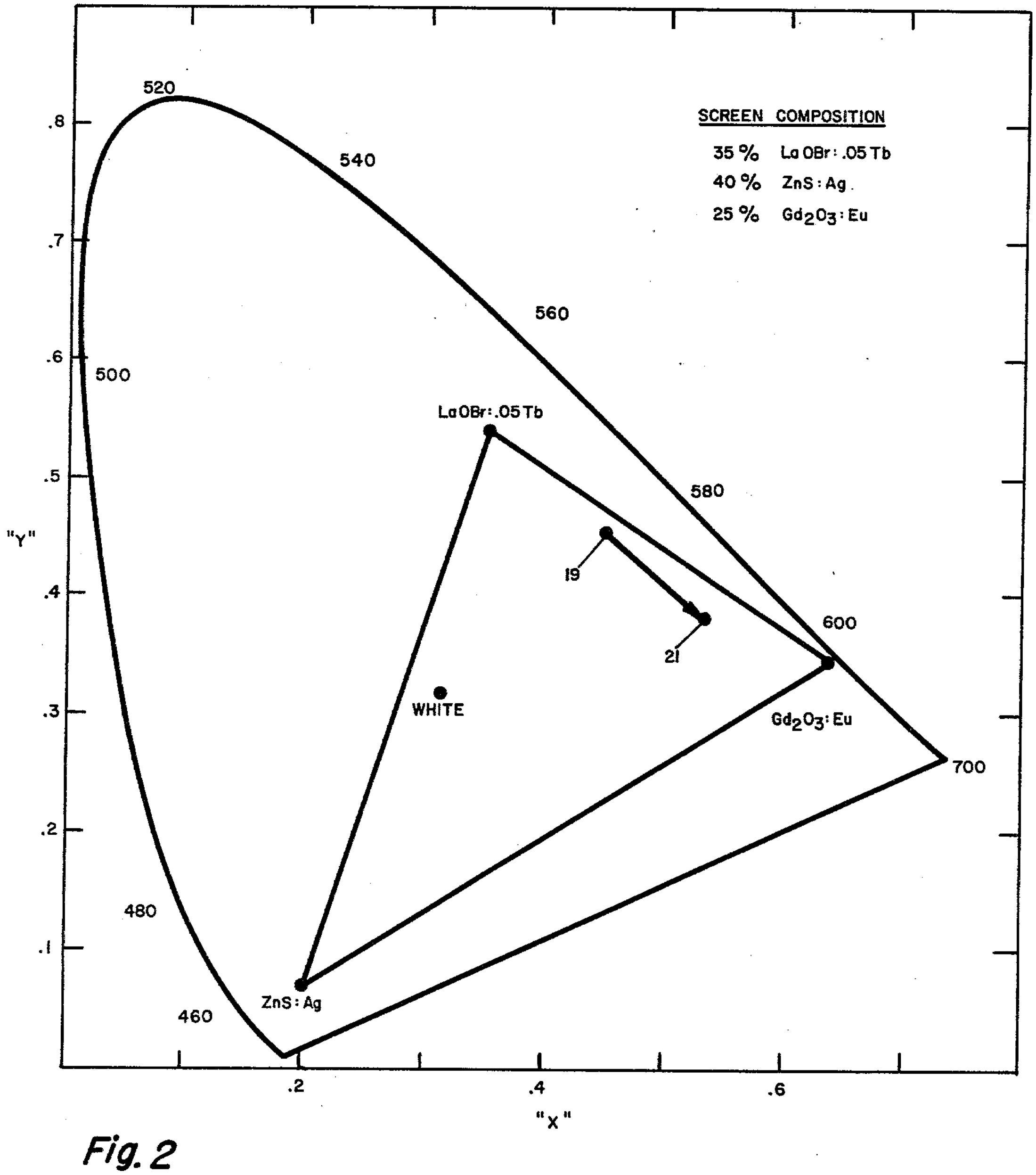
FIG. 2 is a conventional C.I.E. chromaticity diagram depicting color shift attainable with a particular phosphor combination of this invention.

In FIG. 2 there is shown the degree of color shift attainable with the phosphor system disclosed in Example 4 above. The color point for a white color is depicted on the conventional C.I.E. chromaticity diagram for reference along with color points 19 and 21 representing the color shift experienced by said phosphor admixture with the aluminum filtration reported in Table I. It can also be noted from said chromaticity diagram that other color points within the triangle established for said phosphor system can be produced depending upon the particular composition of phosphor admixture being employed as well as other parameters of the x-ray exposure.

Figure 3:
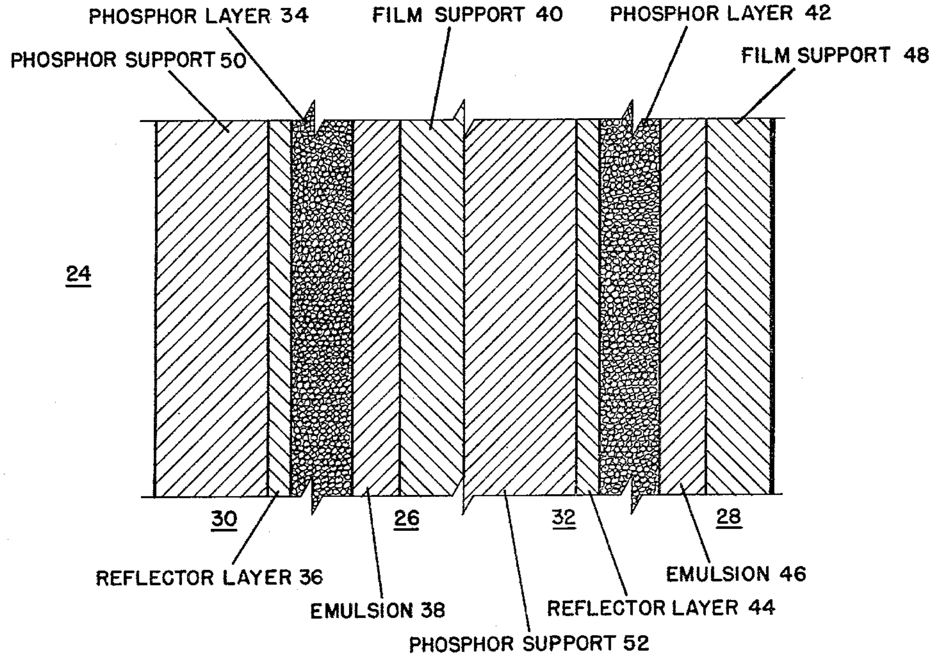
FIG. 3 is a cross section depicting a different x-ray screen construction utilizing the present phosphor system.

FIG. 3 depicts in cross section a composite x-ray image converter device 24 wherein a pair of color photographic films 26 and 28 are operatively associated with a pair of x-ray screen members 30 and 32, respectively, to provide additional color contrast information with a single x-ray exposure on the cooperating photographic films. Specifically, the x-ray screen member 30 which is located adjacent photographic film 26 comprises a phosphor layer 34 deposited upon reflector layer 36 whereas said photographic film member 26 comprises emulsion layer 38 deposited upon a suitable support layer 40. Remaining x-ray screen member 32 which comprises phosphor layer 42 deposited on reflector layer 44 is located adjacent photographic film 28 which comprises emulsion layer 46 being deposited upon another support layer 48. As can be noted, reflector layer 36 underlies x-ray screen member 30 whereas a second reflector layer 44 underlies x-ray screen member 32 to avoid light loss from the individual x-ray screen in the arrangement upon exposure to x-rays. Said reflector layers 36 and 44 are further supported by base layers 50 and 52, respectively, to help provide mechanical handling capability of the x-ray screen members. A phosphor admixture consisting of approximately 40% by weight LaOBr: 0.005 Dy and 60% $[Sr_3(PO_4)_2]_3SrCl_2$:Eu can be employed for each of the phosphor layers and to provide a blended color point having chromaticity values X=0.310 and Y=0.317. Emulsion layer 38 includes a conventional dye producing blue light on transmission whereas remaining emulsion layer 46 includes a different conventional dye giving a yellow color upon transmission. When exposed to a suitable polyenergetic x-ray beam passing through a body part of varying thickness, the composite films together exhibit various shades of grey due to color shift in each associated photographic film from the color point given. On hardening of the x-rays with variations in body thickness, the screen emission color shifts towards the blue region. On a color negative the change would be toward a more yellow color. In addition, changes in greyness and brightness would also occur. Contrast would be significantly enhanced. The particular film-screen system thereby provides an optimum combination of visual density and color information on the two films being employed.

It will be apparent from the foregoing description that a broadly useful novel phosphor combination has been disclosed for x-ray image converter devices and providing improved color image contrast in hue, color saturation and brightness. It should also be appreciated from the foregoing description that various modifications in the specific embodiments above disclosed can be made to optimize these advantages. For example, it will be apparent that specialized color photographic films can be produced for use with particular phosphor combination in order to still further enhance the color contrast obtained in accordance with the above disclosed principles. It is intended to limit the present invention, therefore, only by the scope of the following claims.

What I claim as new and desire to secure by Letters Patent of the United States is:

1. An x-ray image converter which comprises a pair of phosphors each capable of converting x-radiation to visible wavelength radiation of different colors and one of said phosphors exhibiting differential absorption of the x-radiation in the 35–50 KeV region due to different $K_\alpha$ edge effects so as to provide a color shift in an associated color photographic film when exposed to said phosphors after passage through a photographed object.

2. An x-ray image converter as in claim 1 wherein the differential absorption phosphor is a rare earth activated rare earth phosphor.

3. An x-ray image converter as set forth in claim 1 whereas said pair of phosphors is a phosphor mixture.

4. An x-ray image converter as in claim 3 wherein said phosphor mixture is supported on a base member.

5. An x-ray image converter as in claim 3 wherein the proportions of the individual phosphor components in said phosphor mixture is selected to provide a desired color point for the combined emission therefrom.

6. An x-ray image converter comprising:

(a) a pair of color photographic films operatively associated with a pair of x-ray screen members for simultaneous exposure of x-radiation after passage through a photographed object, (b) one of said x-ray screen members emitting light of a specific color being located adjacent a one color photographic film sensitive to said color emission, and (c) the remaining x-ray screen member including a phosphor exhibiting differential absorption of the x-radiation in the 35–50 KeV region due to different $K_\alpha$ edge effects so as to provide a color shift in a different color photographic film being located adjacent said x-ray screen member.

7. An x-ray image converter as in claim 6 which further includes a reflector layer deposited on each phosphor layer.

8. An x-ray image converter as in claim 5 wherein the differential absorption phosphor is a rare earth activated rare earth phosphor.

* * * * *